(12) United States Patent
Pandolfino et al.

(10) Patent No.: US 12,465,256 B1
(45) Date of Patent: Nov. 11, 2025

(54) SYSTEMS AND METHODS FOR ENDOSCOPIC MANOMETRY

(71) Applicant: Northwestern Memorial Healthcare, Chicago, IL (US)

(72) Inventors: John Erik Pandolfino, Wilmette, IL (US); Dustin Allan Carlson, Chicago, IL (US)

(73) Assignee: Northwestern Memorial Healthcare, Chicago, IL (US)

( * ) Notice: Subject to any disclaimer, the term of this patent is extended or adjusted under 35 U.S.C. 154(b) by 0 days.

(21) Appl. No.: 18/932,963

(22) Filed: Oct. 31, 2024

(51) Int. Cl.
*A61B 5/22* (2006.01)
*A61B 5/00* (2006.01)

(52) U.S. Cl.
CPC ............ *A61B 5/227* (2013.01); *A61B 5/6853* (2013.01); *A61B 2562/0247* (2013.01)

(58) Field of Classification Search
CPC .................. A61B 5/227; A61B 5/6853; A61B 2562/0247
See application file for complete search history.

(56) References Cited

U.S. PATENT DOCUMENTS

| | | | |
|---|---|---|---|
| 10,452,813 B2 | 10/2019 | Sorenson et al. | |
| 10,977,796 B2 | 4/2021 | Vincent | |
| 11,238,588 B2 | 2/2022 | Kawagishi | |
| 11,244,755 B1 | 2/2022 | Syeda-Mahmood | |
| 2001/0053920 A1* | 12/2001 | Shaker | A61B 5/4233 606/197 |
| 2009/0024001 A1* | 1/2009 | Parks | A61B 5/42 600/300 |
| 2010/0099974 A1 | 4/2010 | Desai | |
| 2016/0350919 A1 | 12/2016 | Steigauf | |
| 2018/0008156 A1* | 1/2018 | Pandolfino | A61B 1/273 |
| 2018/0055468 A1 | 3/2018 | Reicher | |
| 2019/0088359 A1 | 3/2019 | Moore | |
| 2020/0211692 A1 | 7/2020 | Kalafut | |
| 2020/0250336 A1 | 8/2020 | Stockert | |
| 2020/0321101 A1 | 10/2020 | Karargyris et al. | |
| 2020/0349434 A1 | 11/2020 | Zhang | |
| 2021/0098133 A1 | 4/2021 | Chowdhy et al. | |
| 2021/0216822 A1 | 7/2021 | Palik | |
| 2021/0225512 A1 | 7/2021 | Himeno | |
| 2021/0228276 A1 | 7/2021 | Giraldez | |

(Continued)

FOREIGN PATENT DOCUMENTS

WO 2017152121 A1 9/2017

OTHER PUBLICATIONS

Akshay Arora, et al., "ISTHMUS: Secure, Scalable, Real-time and Robust Machine Learning Platform for Healthcare", Parkland Center for Clinical Innovation, Oct. 1, 2019, pp. 1-11, arXiv: 1909.13343v2.

(Continued)

*Primary Examiner* — Daniel L Cerioni
(74) *Attorney, Agent, or Firm* — Hogan Lovells US LLP

(57) ABSTRACT

Systems and methods include techniques associated with endoscopic manometry. An inflatable structure may be inserted within a tissue structure and inflated or deflated to induce a physiological response for a patient. In operation, the physiological response may be induced while a patient is sedated, which may decrease physical and/or psychological pain to the patient.

12 Claims, 12 Drawing Sheets

(56) References Cited

U.S. PATENT DOCUMENTS

2022/0051114 A1    2/2022  Lyman

OTHER PUBLICATIONS

"Second Opinion—Real-Time Pathology Detection Aid for Denists, from Dentistry's Global AI Leader", Pearl, Inc. (2021) 4 pages Second Opinion—Real-time pathology detection aid for dentists, from dentistry's global AI leader (hellopearl.com).
RadLogics, Inc.—515599—Apr. 5, 2018 | FDA—FDA Warning Letter—Apr. 5, 2018.
GE Healthcare "Marquette 12SL Algorithm Connected Clinical Excellence", General electric Company (2016), 10 pgs.
International Search Report of PCT/US2023/061179, mailed May 8, 2023.

\* cited by examiner

SYSTEMS AND METHODS FOR ENDOSCOPIC MANOMETRY

BACKGROUND

1. Field of Disclosure

Embodiments of the present disclosure relate to systems and methods for performing endoscopic manometry. Specifically, one or more embodiments are directed toward inducing peristalsis in a sedated patient using one or more dilated balloons to obtain manometry measurements.

2. Description of Related Art

Balloon dilation catheters may be used to evaluate or otherwise determine one or more features about a mechanical state of tissue in tube-shaped organs and vessels (e.g., esophagus, arteries, cervix, etc.). Current devices may inflate balloons with a fluid and then measure a cross-sectional area at different locations along a tube length. Additionally, methods may be used to generate flow data from planimetry data acquired with a planimetry catheter while a patient is sedated. However, physicians may be slow to adopt new methods and, instead, may resort to traditional manometry procedures where a patient is kept awake and instructed to perform an action, such as swallowing during an esophageal procedure, resulting in discomfort for the patient and potentially causing patients to defer treatment to avoid the discomfort.

SUMMARY

Applicant recognized the problems noted above herein and conceived and developed embodiments of systems and methods, according to the present disclosure, for performing manometry procedures.

In an embodiment, a system includes a carrier. The system also includes a plurality of sensors associated with the carrier, the plurality of sensors arranged along a length of the carrier. The system further includes an inflatable structure associated with the carrier, the inflatable structure having an injection port to receive a fluid. The system also includes the inflatable structure configured to have at least one of a first diameter, a first volume, or a first cross-sectional area in a relaxed position and at least one of a second diameter, a second volume, or a second cross-sectional area in an engaged position.

In another embodiment, a method includes positioning, an inflatable structure at a designated position associated with a tissue structure of a patient. The method also includes causing a change in at least one of a volume, a cross-sectional area, or a diameter of the inflatable structure. The method further includes determining the change successfully induced a target physiological response. The method also includes logging one or more measurements associated with a condition of the tissue structure. The method includes reversing the change in at least one of the volume, the cross-sectional area, or the diameter of the inflatable structure. The method includes removing the inflatable structure from the tissue structure.

In an embodiment, a system includes a catheter. The system also includes a plurality of sensors arranged along at least a portion of a length of the catheter. The system further includes an inflatable structure associated with the catheter, the inflatable structure having an injection port to receive a fluid to transition between a first inflatable structure volume and a second inflatable structure volume, wherein the first inflatable structure volume is less than the second inflatable structure volume.

BRIEF DESCRIPTION OF DRAWINGS

The present technology will be better understood on reading the following detailed description of non-limiting embodiments thereof, and on examining the accompanying drawings, in which.

DETAILED DESCRIPTION

Figure 1A:
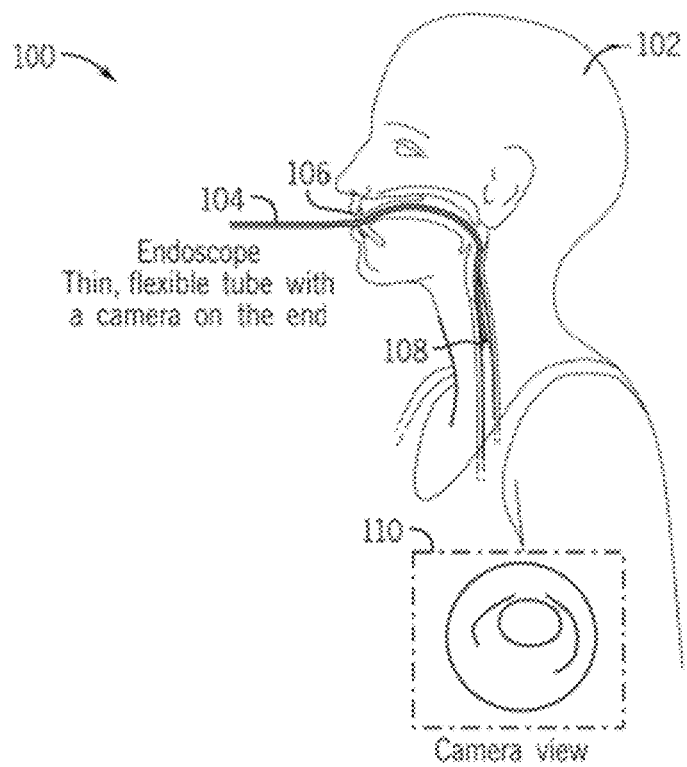
FIGS. 1A-1C illustrates an example representations of esophageal procedures, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose. Additionally, like reference numerals may be used for like components, but such use should not be interpreted as limiting the disclosure.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Like numbers may be used to refer to like elements throughout, but it should be appreciated that using like numbers is for convenience and clarity and not intended to limit embodiments of the present disclosure. Similarly, using different numbering does not necessarily imply that components are different or cannot share one or more features with differently numbered components. Moreover, references to "substantially" or "approximately" or "about" may refer to differences within ranges of +/−10 percent.

Embodiments of the present disclosure may be directed toward systems and methods for performing endoscopic manometry. In at least one embodiment, endoscopic manometry may be performed while a patient is sedated, and therefore, may decrease discomfort during the procedure and/or resulting trauma and/or fear as a result of the treatment. Various embodiments of the present disclosure may use one or more inflatable structures (e.g., balloons) that may be integrated into and/or attached to a manometry catheter. The one or more inflatable structures may be coupled to a fluid source (e.g., a gas, a liquid, a solid, or combinations thereof) that may be used to add and/or remove fluid from the balloon. As the balloon inflates and relaxes, a simulated peristalsis may be observed using one or more sensors associated with the manometry catheter. Accordingly, systems and methods may trigger a swallowing-like action (secondary peristalsis) while the patient is sedated, as opposed to traditional manometry where the patient is awake and is required to swallow during the procedure (primary peristalsis). In this manner, manometry may be performed while a patient is sedated, such as during an endoscopy, which increases patient comfort and also reduces a likelihood of post-operation problems with patients, such as various psychological problems.

Various embodiments of the present disclosure may address and overcome problems associated with traditional manometry procedures. For example, manometry typically involves insertion of a catheter into a patient nasal cavity to position one or more sensors along the esophagus (e.g., from the upper esophageal sphincter (UES) through the lower esophageal sphincter (LES)). During the procedure, the patient is awake and may be induced to swallow liquid to evaluate swallowing disorders. For example, the pressure of the sphincter muscles and/or the tissue along the esophagus may be recorded. However, performing the procedure while the patient is awake may be uncomfortable, both physically and psychologically. Embodiments address and overcome this problem by performing manometry while the patient is sedated by simulating and/or otherwise inducing a substantially similar swallowing response (secondary peristalsis) using one or more inflatable structures, such as balloons. As a result, one or more practitioners may direct fluid into the inflatable structures, observe an equivalent swallowing event, and then record readings along the manometry catheter. In this manner, the procedure may be performed at the same time as an endoscopy, and/or at a different time and/or during the same appointment, and may be more pleasant and time saving for the patient. Additionally, embodiments address and overcome problems associated with mistrust or slow adoption of other techniques, such as impedance planimetry systems.

Systems and methods of the present disclosure may be directed toward one or more tools that may be used to perform a medical procedure, such as but not limited to, esophageal manometry. However, it should be appreciated that the one or more tools are not limited to such a procedure and may be incorporated into other procedures that may use manometry to evaluate tissues and/or sphincter health. Embodiments may incorporate one or more inflatable structures that may be positioned at a target location associated with a patient or user. The one or more inflatable structures may be particularly located along one or more catheters, which may be used to perform one or more additional procedures simultaneously or at least partially simultaneously, with the manometry procedures. Systems and methods may also provide one or more control and/or measurement systems to enable inflating and deflating of the one or more inflatable structures and to record data, such as from sensors associated with a manometry catheter and/or additional sensors associated with the one or more inflatable structures, to monitor a simulated swallowing event with the patient and then to correlate the information to various data readings. In this manner, manometry may be performed while a patient is sedated, as opposed to traditional approaches where a patient is awake and actively swallowing.

FIG. 1A illustrates a schematic representation 100 of an endoscopy procedure. In this example, a patient 102, which is shown as a human patient, receives an endoscope 104 through a mouth 106 that is directed through an esophagus 108. As will be appreciated, the endoscopy procedure is traditionally performed under sedation, which may be more comfortable for the patient 102 than undergoing a procedure without sedation, even with a local or general anesthetic to relieve pain symptoms. The endoscope 104 in this example includes an imaging device, such as a camera, that may be used to obtain one or more still images and/or videos 110 of an internal organ, such as the esophagus 108.

Figure 1B:
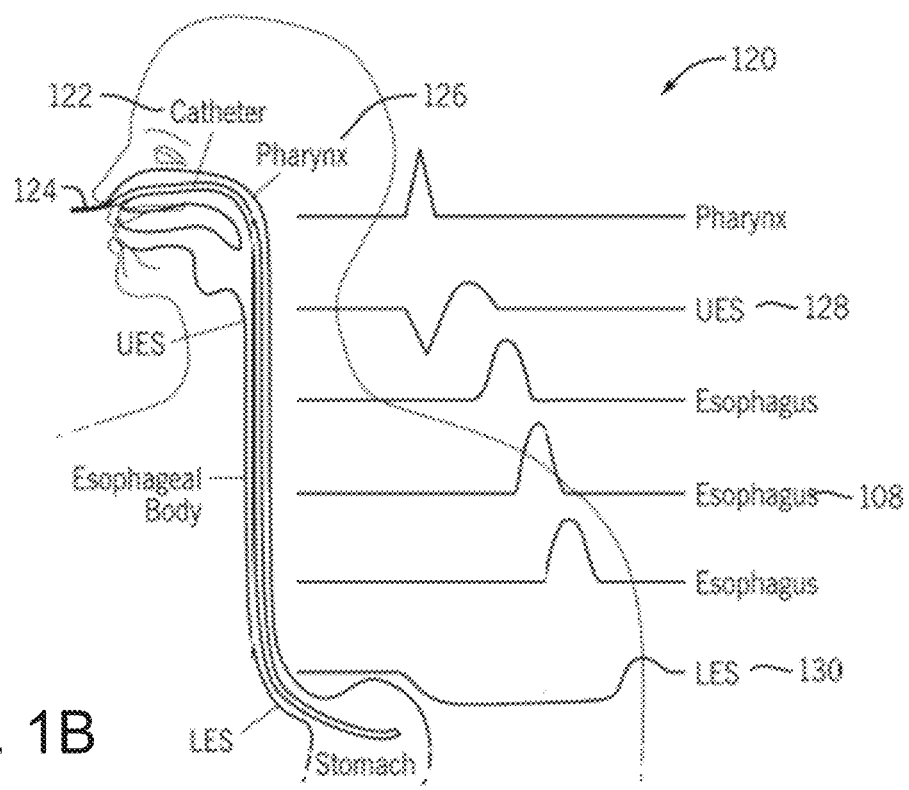

FIG. 1B illustrates a schematic representation 120 of a manometry procedure. In this example, the patient 102, which is also shown as a human patient, receives a catheter 122 through an orifice, which in this example is inserted transnasally through a nose 124 and then extends down through a pharynx 126 toward the esophagus 108. This example illustrates additional components of the esophagus to illustrate various portions that may be evaluated by the catheter 122, which may form a portion of a manometry catheter that includes one or more sensors, as discussed herein. The catheter 122 extends through an upper esophageal sphincter (UES) 128 and a lower esophageal sphincter (LES) 130 in this example. As will be appreciated, the manometry procedure is traditionally performed without sedation and the patient 102 is induced to swallow, such as swallowing a liquid, as different readings are acquired by the catheter 122. This procedure is often painful and/or uncomfortable for the patient 102, both physically and psychologically. However, manometry may provide information that may be used to diagnose a variety of different swallowing problems, and therefore, patients often need to endure the procedure as part of their evaluation and treatment. One or more embodiments of the present disclosure may address and overcome this problem by providing one or more tools that may permit manometry to be performed while the patient 102 is sedated, thereby reducing the physical and psychological discomfort often associated with the procedure. As discussed herein, embodiments may include one or more inflatable structures to mimic or otherwise simulate the swallowing undertaken by the patient 102 during a normal procedure, thereby acquiring data without active participation by the patient 102.

As discussed here, simulating swallowing may refer to one or more actions taken to cause one or more tissues to contract or relax and/or to induce one or more physiological responses, which may include one or more autonomic responses. In at least one embodiment, systems and methods are directed toward swallowing, but it should be appreciated that embodiments may be used in a variety of applications where peristalsis occurs. Regarding a swallowing process, muscular contractions of the esophagus occur in peristaltic waves, which includes a wave of relaxation and a wave of contraction, to move a bolus along the esophagus. The peristaltic contractions cause relaxation of the LES in the esophagus as the peristaltic waves approach the stomach. A similar process may also be associated with other tissue structures, such as the stomach.

Figure 1C:
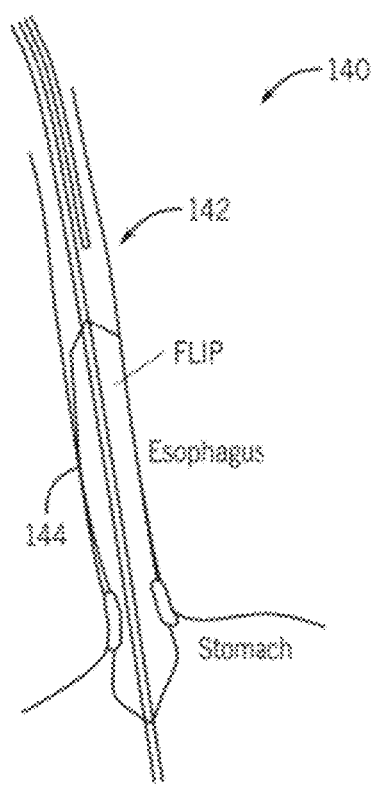

FIG. 1C illustrates a schematic representation 140 of a testing procedure that incorporates an impedance planimetry system 142, such as a functional lumen imaging probe (FLIP). The impedance planimetry system 142 includes a series of sensors 144. As will be appreciated, the procedure may be performed while a patient is sedated, and therefore, may be more comfortable when compared to manometry. However, clinicians may be slow to adopt new techniques, such as the impedance planimetry system 142, and may prefer or otherwise have reasons for using manometry. Systems and methods of the present disclosure may further overcome existing problems by using manometry, which may be a preferred method, but by incorporating one or more inflatable structures to enable use of manometry while a patient is sedated, such as during an endoscopy.

Figure 2A:
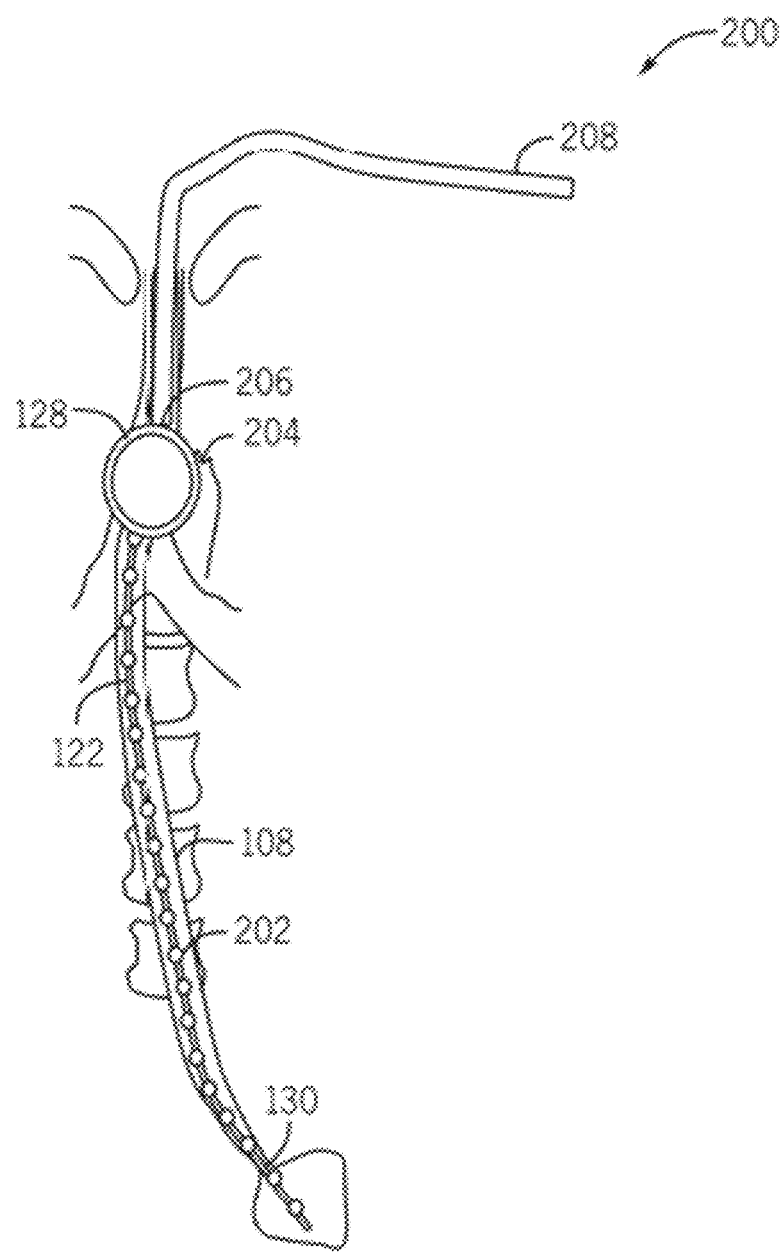
FIG. 2A illustrates an example representation of an esophageal procedure using an endoscopic manometry system, in accordance with embodiments of the present disclosure.

FIG. 2A illustrates a schematic representation 200 of an endoscopic manometry procedure that may be used with systems and methods of the present disclosure. In this example, the catheter 122 that may be associated with the manometer and includes a number of sensors 202 extending through the esophagus 108. Additionally, this example includes an inflatable structure 204, which may be a balloon, positioned proximate the UES 128. An infusion port 206 may enable a fluid to be directed toward the inflatable structure 204 to cause the inflatable structure 204 to expand. In at least one embodiment, the infusion port 206 is coupled to a flow path 208 that may be associated with one or more sources (not pictured) and/or fluid movers (not pictured). For example, the fluid may be air that is directed toward the inflatable structure 204 via a pump or compressor. Additionally, the pump or compressor may be used to remove the fluid from the inflatable structure 204, for example after a period of time. Various embodiments may also use a liquid to inflate the inflatable structure 204, such as a saline solution, or a slurry, among various other options.

After a period of time, the fluid may be removed from the inflatable structure 204, which may reduce an overall size (e.g., a diameter, a volume, a cross-sectional area, etc.) of the inflatable structure 204 within the esophagus 108. The process may be repeated a number of times to inflate and then deflate the inflatable structure 204, which may mimic or otherwise simulate swallowing through the distention (secondary peristalsis). For example, systems and methods of the present disclosure may be used to induce or otherwise mimic peristalsis. Peristalsis may refer to symmetrical contraction and relaxation of muscles that propagate down a tube. For example, the position of the inflatable structure 204 below the UES 128 may mimic relaxation and contraction associated with the esophageal phase of swallowing. Filling the inflatable structure 204 to a target size may be used to mimic entry of a bolus into the esophagus, which may cause relaxation of the LES 130 to receive the bolus, which may be part of an involuntary, autonomic reaction. Thereafter, removing the fluid from the inflatable structure 204 may cause contraction of the LES 130.

Figure 2B:
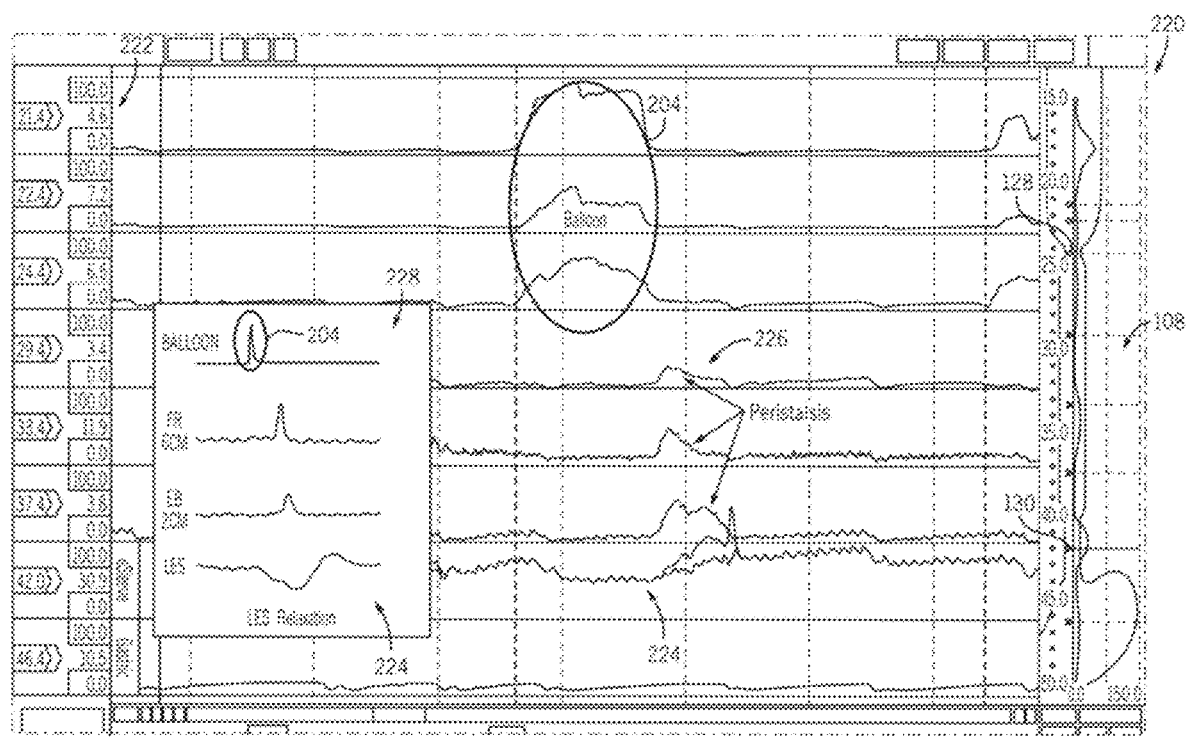
FIG. 2B illustrates an example graphical representation of data acquired during an endoscopic manometry procedure, in accordance with embodiments of the present disclosure.

FIG. 2B illustrates a graphical representation 220 of sensor readings that may be used with embodiments of the present disclosure. As shown, different sensor readings 222 are substantially aligned with their position along the esophagus 108, which is graphically represented along with right side. The inflatable structure 204, which as noted herein may also be referred to as a balloon, is illustrated near and/or at the UES 128. When inflated (e.g., filled with fluid to some threshold amount), relaxation 224 of the LES 130 is shown with resulting peristalsis 226 following. Accordingly, a clinician performing the procedure and/or a software system monitoring the sensor readings 222, may control inflation and deflation of the inflatable structure 204 to mimic/induce peristalsis and obtain sensor readings, which may then be used for diagnostic or treatment purposes. In this manner, systems and methods of the present disclosure may obtain manometer readings while a patient is sedated by inducing peristalsis with the inflatable structure 204 instead of having an awake patient repeatedly swallow during the procedure. As shown by a simplified representation 228, the LES relaxation 224 is associated with expansion of the inflatable structure 204, thereby inducing the resulting peristalsis.

Figure 3A:
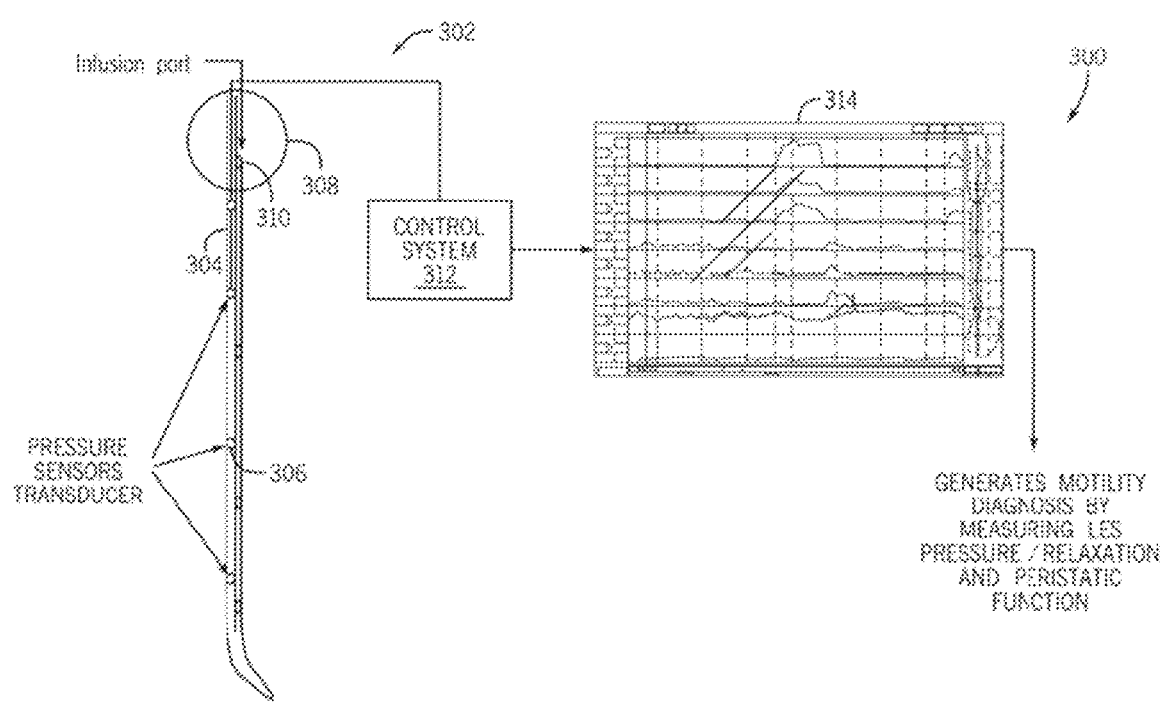
FIG. 3A illustrates a schematic representation of an endoscopic manometry procedure, in accordance with embodiments of the present disclosure.

FIG. 3A illustrates a schematic representation of an environment 300 that may be used with embodiments of the present disclosure. In this example, an endoscopic manometry system 302 may be used to acquire data along with one or more procedures, and/or independent from another procedure, such as endoscopy. The illustrated system 302 includes a catheter 304, which may share features with the catheter 122, having a number of sensors 306. The catheter 304 and one or more sensors 306 may be a manometer, which may refer to a device used to measure pressures. In this example, the sensors 306 may be pressure transducers and may include any number of sensors that may be positioned at particular locations along the catheter 304. For example, the sensors 306 may be evenly spaced or may be positioned with more sensors 306 in locations that are identified as being more relevant or otherwise would benefit from receiving more sensor readings. In at least one embodiment, there may be up to or approximately 36 sensors 306. However, 36 is provided by way of non-limiting example and there may be more or fewer sensors 306. For example, there may be 10 sensors, 20 sensors, 30 seconds, 40 sensors, or any reasonable number of sensors. Furthermore, positions of the sensors 306 may be particularly selected based on one or more desired operating parameters. For example, the sensors 306 may be evenly spaced along a length of the catheter 304. However, the sensors 306 may be also be arranged in a configuration where there is uneven spacing, which may be used to concentrate a larger number of sensors 306 in a particular location. Accordingly, systems and methods of the present disclosure may be tunable with different catheter lengths and/or sensor numbers based on a given procedure or desired set of measurements.

The system 302 further illustrates the one or more balloons 308, which as discussed herein my be any type of inflatable or expandable structure. The balloons 308 may be arranged at different locations along the catheter 304 and/or may be positioned at one particular location, such as at a location that is intended to align with the UES. As discussed herein, because the system may be used with a variety of patients having different sizes and anatomical structures, there may be multiple balloons 308 to increase a likelihood of positioning a balloon at a desired location. The balloons 308 may be associated with one or more infusion ports 310 that may be used to direct a fluid (e.g., gas, liquid, solid, combinations thereof) into the balloon 308 and/or out of the balloon 308. For example, driving a fluid, such as air, into the balloon 308 may inflate the balloon 308, effectively increasing an occupied volume of the balloon 308 (e.g., increasing a cross-sectional area, increasing a diameter, etc.), which may create a response within the body, when inserted within the esophagus, to drive one or more physiological responses, such as a peristatic function.

This examples includes a common catheter 304 that includes the infusion port 310 and the sensors 306. For example, the catheter 304 may be approximately 5 mm and the infusion port 310 may be approximately 2 mm. The balloon 308 may be approximately 3 mm with a maximum diameter of approximately 30 mm, which may be used to receive approximately 20 mL of fluid. It should be appreciated that the measurements are provided by way of non-limiting example only and are not intended to limit the scope of the present disclosure. For example, the catheter 304 may be greater than or less than 5 mm. The catheter 304 may be approximately 1 mm, approximately 2 mm, approximately 3 mm, approximately 4 mm, approximately 6 mm, approximately 7 mm, or any other reasonable size. Additionally, the balloon 308 may be greater than or less than 3 mm and/or have a maximum diameter that is greater than or less than 30 mm. For example, the balloon 308 may be approximately 1 mm, approximately 2 mm, approximately 4 mm, approximately 5 mm, approximately 6 mm, approximately 7 mm, or any other reasonable size. Additionally, the balloon maximum diameter may be approximately 10 mm, approximately 20 mm, approximately 40 mm, approximately 50 mm, between approximately 10 mm and approximately 30 mm, between approximately 20 mm and approximately 40 mm, or any other reasonable size. Moreover, the infusion port 310 may be greater than or less than 2 mm. The infusion port 310 may be approximately 1 mm, approximately 3 mm, approximately 4 mm, or any other reasonable size.

One or more control systems 312 may be used to acquire data from the system 302, for example from the one or more sensors 306. The control system 312 may include data acquisition software stored on one or more memories executed by one or more processors. For example, software may be configured to receive a signal from the one or more sensors 306 and then convert that signal to a pressure reading for visual representation 314 on one or more displays. In at least one embodiment, the visual representation 314 may correspond to a motility diagnosis by measuring LES pressure/relaxation and peristatic function.

In at least one embodiment, the one or more control systems 312 may also be used to control the flow of fluid into and/or out of the balloon 308. For example, the one or more control systems 312 may be coupled to one or more fluid movers, such as a pump or compressor, to drive fluid into and/or remove fluid from the balloon. The one or more control systems 312 may execute based on stored software instructions or may receive manual inputs from an operator, or combinations thereof. Accordingly, systems and methods may be used to obtain manometry readings while a patient is sedated and/or underdoing other procedures, such as endoscopy.

Figure 3B:
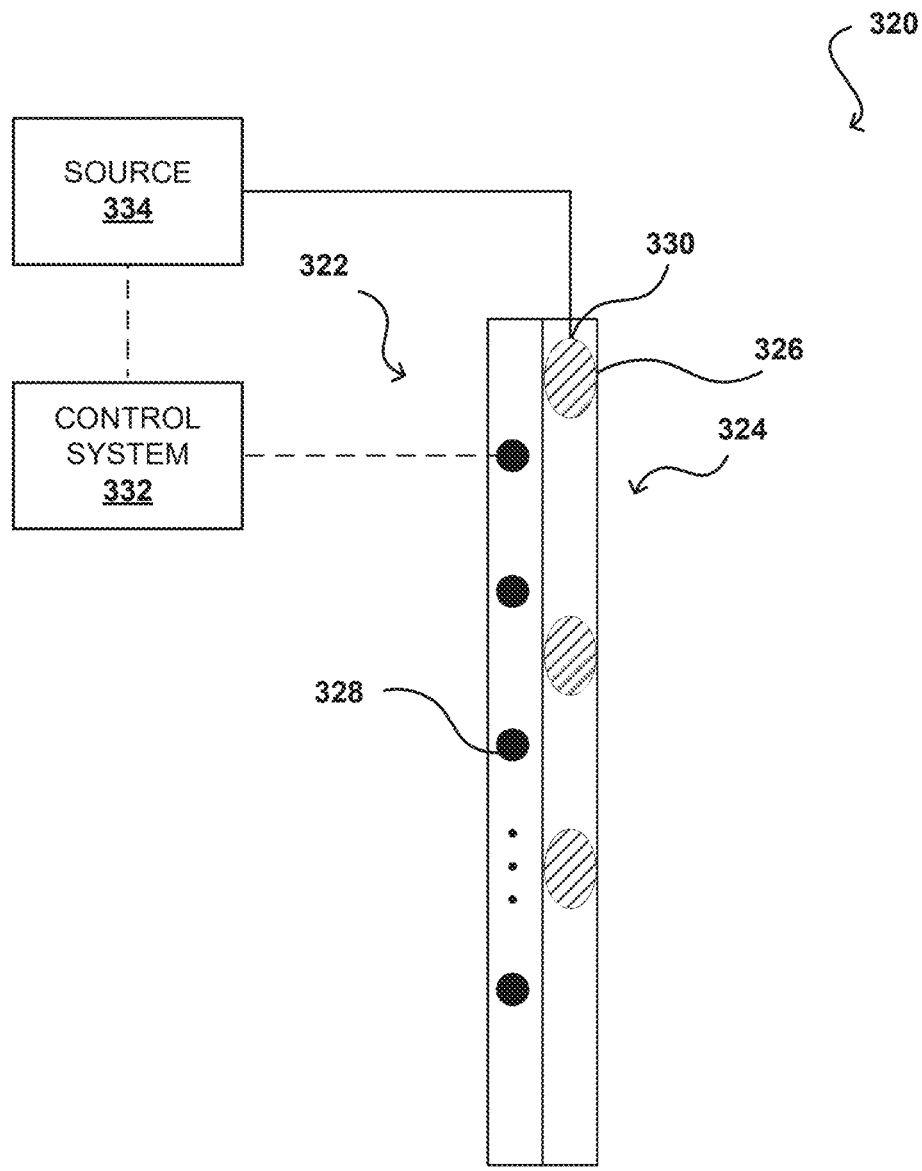
FIGS. 3B and 3C illustrate schematic representations of endoscopic manometry systems, in accordance with embodiments of the present disclosure.

FIG. 3B illustrates a schematic representation of an endoscopic manometry system 320 that may be used with embodiments of the present disclosure. As discussed herein, the system 320 may share one or more features with the system 302 discussed in FIG. 3A and/or other systems discussed herein that may be used to perform manometry while a patient is sedated. This example includes a catheter 322 (e.g., body, carrier, etc.) that has an integrated inflation system 324 that may be used to carry one or more inflatable structures 326 along with a series of sensors 328. In operation, one or more injection ports 330 may receive a fluid from a source to cause an increase in volume, diameter, and/or cross-sectional area of the one or more inflatable structures 326. Embodiments may refer to a relaxed state in which the volume, diameter, and/or cross-sectional area is less than an engaged state. One example configuration includes a first diameter (relaxed state) of 3 mm and a second diameter (engaged state) of 30 mm. It should be appreciated that other diameters may be used within the scope of the present disclosure and the ten-fold increase is by way of example and is not intended to be limiting.

A control system 332 may be used to regulate flow of fluid toward the injection port 330 and/or to receive measurement data from the sensos 328. In this example, a source 334 may be used to provide fluid to the one or more inflatable structures 326, which may be air in various embodiments. However, as discussed herein, air is one example that may be used to inflate the structure 326 and other gases may be used, such as nitrogen or carbon dioxide, as non-limiting examples. Additionally, as also discussed herein, liquids may be used to inflate the structure 326, such as saline solutions or stile water, as non-limiting examples The source 334 may include one or more fluid movers. Additionally, in at least one embodiment, the source may be a pressurized source and the injection port 330 may include a release valve to deflate the one or more inflatable structures 326. Systems and methods may therefore provide an integrated system including sensors and inflatable structures in order to perform endoscopic manometry. In one example, the integrated structure may further include one or more imaging devices, thereby proving an integrated endoscope within the system. In other embodiments, the structure may be coupled to the endoscope. Various embodiments may be used to form the system 320 from a variety of materials, such as composite or polymer materials that may be considered sterile or otherwise suitable for use within humans. The system 320, and/or components thereof, may be disposable or partially disposable. In at least one embodiment, as discussed herein, the control system 332 may be automated and/or semi-automated. For example, the control system 332 may use sensor information to detect inflation of the structure 326, relaxation of the LES, and subsequent peristalsis. As a result, the control system 332 may then be used to deflate the structure 326 and optionally repeat the process. Furthermore, or alternatively, the control system 332 may at least partially operate using manual or semi-manual inputs from an operator. For example, the control system 332 may output a display associated with sensor readings and the operator may determine when LES relaxation has occurred responsive to structure inflation in order to induce peristalsis. The operator may then reverse or otherwise cause the process to repeat. Over time, the control system 332 may learn which sensor readers correspond to the desired output (e.g., peristalsis) based on an analysis of different sensor readings, for example by training one or more machine learning systems and/or by establishing different control schemes or rules based on thresholds or other criteria determined from historical information.

Figure 3C:
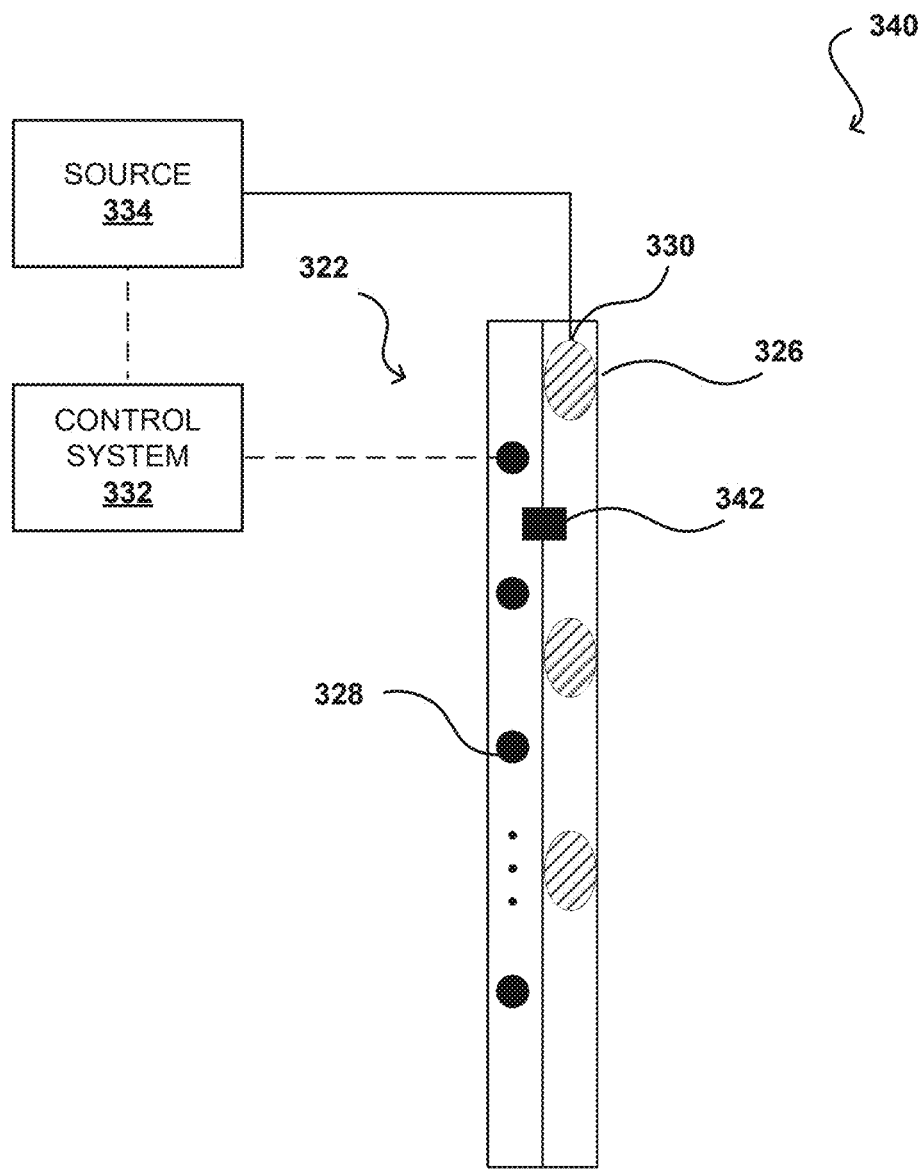

FIG. 3C illustrates a schematic representation of an endoscopic manometry system 340 that may be used with embodiments of the present disclosure. As discussed herein, the system 340 may share one or more features with the system 302 discussed in FIG. 3A and/or other systems discussed herein that may be used to perform manometry while a patient is sedated, such as the system 320 of FIG. 3B. This example includes the catheter 322 that is coupled to the inflation system 324 via one or more coupling devices 342. The coupling devices 342 may include clips, bands, and/or other components to secure the inflation system 324 to the catheter 322. There may be any reasonable number of coupling devices 342, which may be positioned at a variety of locations to secure components together. As discussed herein, the inflation system 324 may be a separate catheter or body that carries the one or more inflatable structures 326. In operation, one or more injection ports 330 may receive a fluid from the source 324 to cause an increase in volume and/or cross-sectional area of the one or more inflatable structures 326. The control system 332 may be used to regulate flow of fluid toward the injection port 330 and/or to receive measurement data from the sensos 328. In this example, the source 334 may be used to provide fluid to the one or more inflatable structures 326, which may be air in various embodiments. Systems and methods may therefore provide a separately attachment inflation system 324 that may be used with existing manometers and/or endoscopes.

FIGS. 4A-4D illustrate representations 400, 420, 440 associated with a procedure to perform endoscopic manometry. As discussed herein, systems and methods may be directed toward one or more tools and operational aspects of the one or more tools to perform manometry while a patient is sedated. Embodiments may address and overcome problems with existing configurations and methods in which a patient is awake during manometry, for example with a transnasal catheter, and is directed to swallow to as sensor data is collected. Existing approaches are both physically and psychologically uncomfortable for patients. Systems and methods may permit manometry while a patient is sedated, such as during an endoscopy procedure, thereby increasing comfort for the patient. Furthermore, embodiments may be used to mimic or otherwise simulate swallowing, which permits operation of the manometry probe while the patient is sedated, as opposed to traditional approaches where a patient is awake and following instructions from an operator.

Figure 4A:
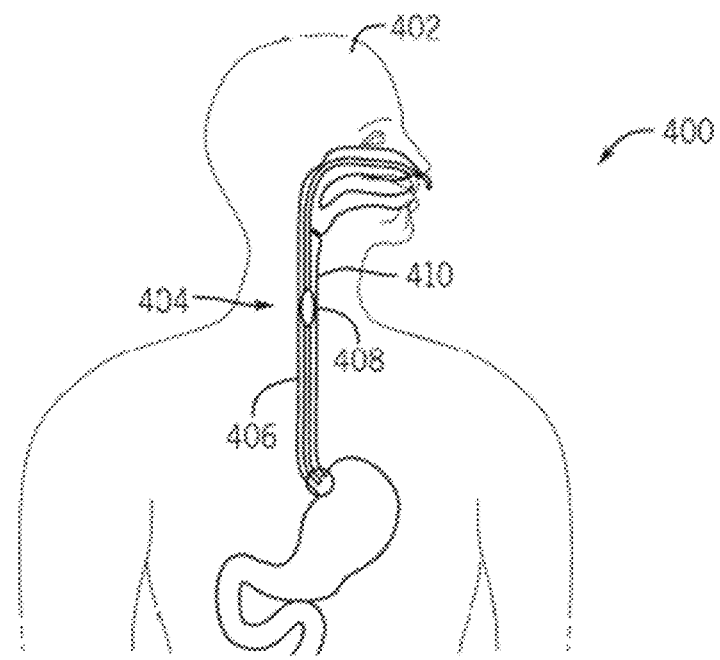
FIGS. 4A-4C illustrate schematic representations of an endoscopic manometry procedure, in accordance with embodiments of the present disclosure.

FIG. 4A illustrates the representation 400 of a patient 402 having an endoscopic manometry system 404 inserted through an esophagus 406. The system 404 includes sensors (not pictured) and a balloon 408. In this configuration, the balloon 408 is positioned in the proximal esophagus. That is, a diameter of the balloon 408 may be said to be relaxed such that relaxation of the LES is not induced.

Figure 4B:
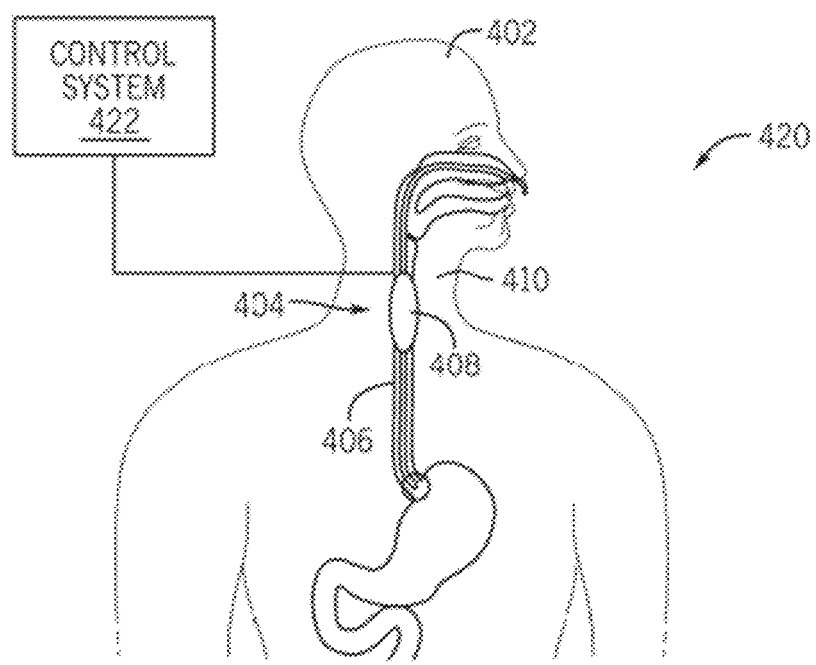

FIG. 4B illustrates the representation 420 of the patient 402 in which the balloon 408 is filled, for example via one or more commands from a control system 422, which may be an automated command or a human-input command, such that the balloon 408 has now expanded at the UES 410. The expansion of the balloon 408 may mimic a swallowing procedure, which may send a signal to the autonomic system of the patient 402 to relax the LES, much like during swallowing when the patient 402 is awake. However, as discussed herein, the illustrated procedure may be performed while the patient 402 is sedated, and therefore, the swallowing is simulated by the expansion and contraction of the balloon 408, rather than actions of the patient 402. The sensors may then obtained one or more readings associated with operation of the tissues of the esophagus, which may be received by a control system 422. In at least one embodiment, the control system 422 may be used to provide a visual representation of the sensor data, which may include a graphical representation, as discussed herein. The control system 422 may also be used to send and/or receive different commands, such as a command to inflate the balloon 408 and/or a command to deflate the balloon 408. As discussed herein, the commands may be automated or provided by an operator performing the procedure, or may be a combination thereof.

Figure 4C:
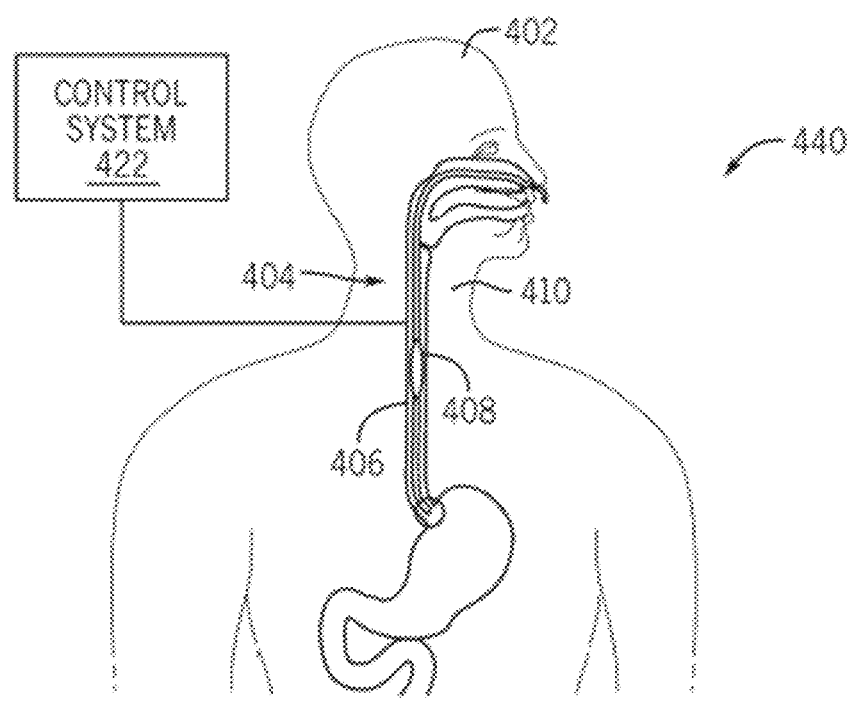

The process may be reversed to remove the fluid directed toward the balloon 408 causing the inflation, as shown in the representation 440 of FIG. 4C. Sensor information may be used to determine when peristalsis occurs due to the inflation and deflation of the balloon 408, which may then be correlated to other sensor data to correlate operation of the esophagus to different pressure readings, which may be used for diagnostic purposes. In one or more embodiments, sensor information may be processed to provide a recommended diagnosis. In other embodiments, sensor information may be used to guide or otherwise facilitate a diagnosis by one or more practitioners.

Figure 5:
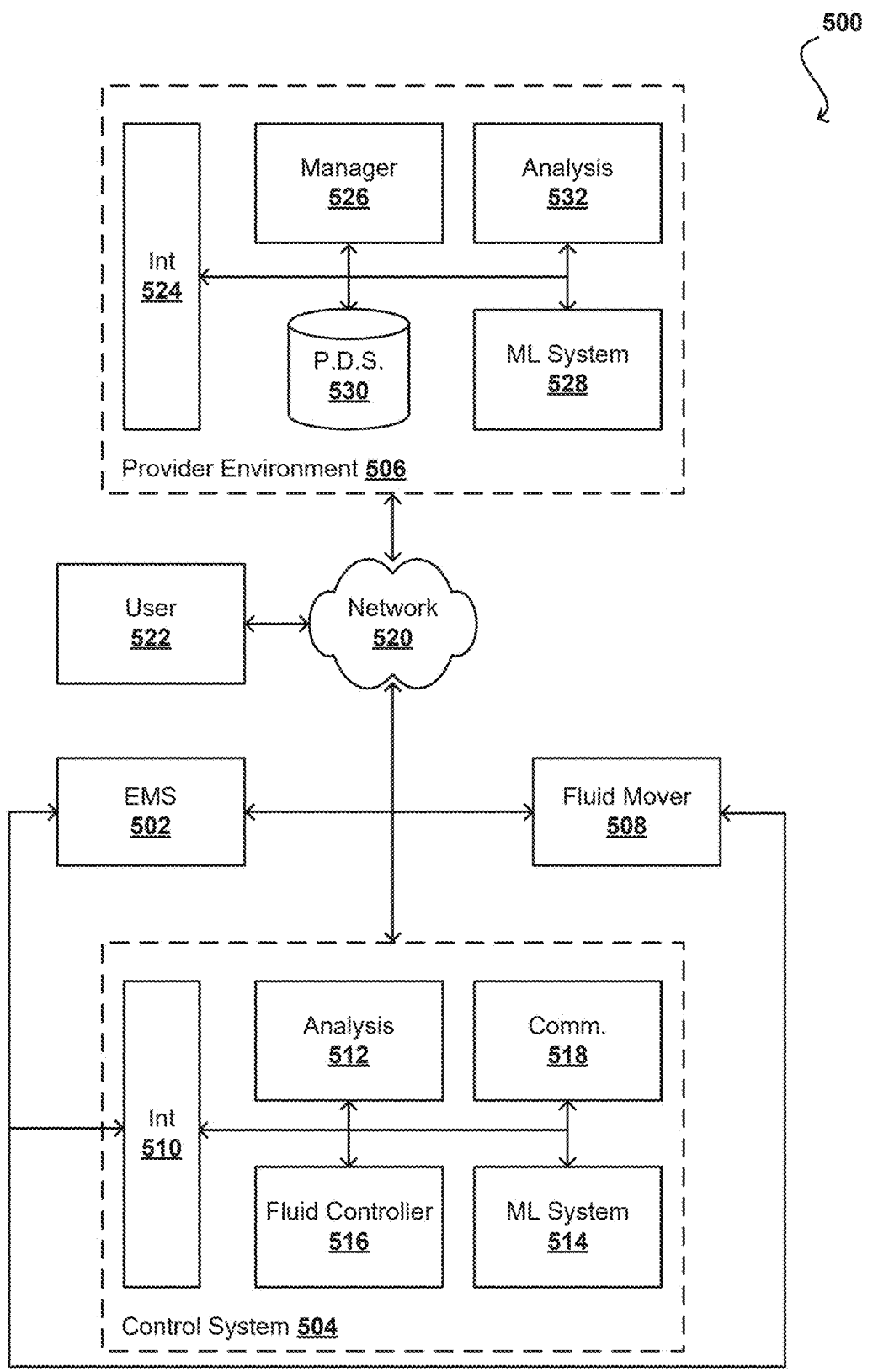
FIG. 5 illustrates an example system for performing an endoscopic manometry procedure, in accordance with embodiments of the present disclosure.

FIG. 5 illustrates an example system 500 that may be used with embodiments of the present disclosure. Systems and methods of the present disclosure may be directed toward an endoscopic manometry system (EMS) 502 that may acquire data, such as pressure data associated with an organ or tissue, for evaluation by one or more control systems 504 and/or provider environments 506 that may be used for diagnostic evaluations and/or treatment. In one or more embodiments, the EMS 502 may include one or more catheters that may include sensors for performing manometry and one or more inflation systems that may be used to inflate and deflate a deformable structure, such as a balloon, to simulate a swallowing event and/or other event within an organ. Embodiments may also include supporting components associated with the deformable structure. For example, the embodiment of FIG. 5 includes a fluid mover 508, such as a pump or compressor, that may be used to direct a fluid (e.g., gas, liquid, solid, combinations thereof) to the deformable structure. The control system 504 may be a local or remote control system that may include one or more interfaces 510. The interfaces may include physical or wireless interfaces to couple data and control systems, such as wires, to the control system 504, to enable software instructions to control one or more operations and/or to receive collected data. As an example, sensors of the EMS 502 may be coupled to the control system 504 and analyzed by an analysis engine 512 to identify one or more salient features, which may be associated with induction of peristalsis responsive to operation of the balloon, one or more readings indicating of damage or abnormal function of tissues, and/or combinations thereof. In certain embodiments, the analysis engine 512 may convert signals received from the EMS 502 into visualized information, such as converting a signal into a pressure value and/or plotting signals to illustrate changes over time. In at least one embodiment, one or more machine learning (ML) systems 514 may be used to evaluate and analyze information acquired by the EMS 502. For example, one or more pattern recognition models may be used to identify sensor data that is indicative of one or more conditions. The pattern recognition models may include one or more machine learning models, as discussed herein, that may be trained on labeled or unlabeled data to recognize patterns within a data stream. By way of non-limiting example, one or more models may recognize graphical representations of sensor data, such as those shown in FIG. 2B, to identify reading associated with balloon expansion, LES relaxation, peristalsis, and/or combinations thereof. In at least one embodiment, relationships may be formed between a particular sensor reading for balloon expansion and LES relaxation, such as a passage of time and/or an alignment between expansion and relaxation.

In at least some embodiments, language models, such as large language models (LLMs) or visional language models (VLMs) and/or other types of generative artificial intelligence (AI) may be implemented as part of the ML system 514. These models may be capable of understanding, summarizing, translating, and/or otherwise generating text (e.g., natural language text, labels, etc.), images, video, and/or the like, based on the context provided in input prompts or queries. The models (e.g., LLMs, VLMs, etc.) may be used for summarizing textual data, analyzing and extracting insights from data (e.g., textual, image, video, etc.), and generating new content (e.g., text, image, video, audio, etc.). Various embodiments may also include single modality models (e.g., exclusively for text or image processing) or multi-modality models (e.g., receiving combinations of inputs). For example, VLMs may accept image, video, audio, textual, 3D design, and/or other inputs data types and/or generate or output image, video, audio, textual, 3D design, and/or other output data types. In at least one embodiment, image data may correspond to graphical representations from the sensor readings and the VLMs may analyze the sensor readings to provide a diagnostic recommendation and/or to provide an indication where peristalsis occurred, among other options.

Various types of architectures may be implemented in various embodiments, and in certain embodiments, architecture may be technique-specific. As one example, architectures may include recurrent neural networks (RNNs) or long short-term memory networks (LSTMs), transformer architectures (e.g., self-attention mechanisms, encoder and/or decoder blocks, etc.), convolutional neural networks (CNNs), and/or the like.

In various embodiments, the models may be trained using unsupervised learning, in which models learn patterns from large amounts of unlabeled training data (e.g., text, audio, video, image, etc.). Furthermore, one or more models may be task-specific or domain-specific, which may be based on the type of training data used. Additionally, foundational models may be used and then tuned for specific tasks or domains. Some types of foundational models may include question-answering, summarization, filling in missing information, and translation. Additionally, specific models may also be used and/or augmented for certain tasks, using techniques like prompt tuning, fine-tuning, retrieval augmented generation (RAG), adding adapters, and/or, the like.

The control system 504 may be used to transmit instruction responsive to one or more executed software instructions and/or based on human-input information. For example, a fluid controller 516 may be used to regulate operation of the fluid mover 508, for example to control inflation and deflation of the balloon. The control may be responsive to a human input monitoring a sensor response to determine a start or end of peristalsis and/or based on an evaluation of sensor data, such as by the ML system 514, to recognize a start or end of peristalsis, which may trigger inflation and/or deflation of the balloon using the fluid mover 508.

One or more embodiments may further include a communication system 518 that may be used to send and/or receive information from the provider environment 506, for example via one or more networks 520. In at least one embodiment, the control system 504 may be a local system that is in place where a procedure is performed using the EMS 502 and the provider environment 506 may be associated with a cloud environment that may be used to evaluate information in real or near-real time, receive data for later evaluation, receive data for storage, and/or combinations thereof.

Providing information to the provider environment 506 may permit further analysis or access to the data by one or more authorized users 522. In this example, the one or more authorized users 522 may be represented by one or more computing devices configured to submit requests over the at least one network 520 to be received by the provider environment 506. The provider environment 506 may be an online platform provided by a service provider and/or for an affiliate, for example the environment 506 may be hosted or otherwise provided via one or more cloud resource providers on behalf of a service provider. A computing device may be a representative and/or act as a proxy for one or more users 522 that may be submitting requests. For example, a user may navigate to one or more dashboards, web applications, landing pages, or access points using the device to submit a request, among other options. Additionally, in at least one embodiment, the client computing device may act as a proxy to execute stored instructions to make and receive requests. For example, the client computing device may send a request responsive to receiving one or more inputs and/or the like. As another example, a request may be transmitted as part of an automated or semi-automated workflow, which may or may not receive user interaction. Accordingly, the client computing device may be used with direct input from one or more users, from stored software instructions, from executions of various workflows, or combinations thereof.

In at least some embodiments, the request can include a request to execute one or more workflows associated with analysis and/or processing of electronic health records (EHRs), including evaluation of data (e.g., imaging data, video data, text data, audio data, combinations thereof, etc.), among other options. It should be appreciated that EHR is provided by way of non-limiting example and systems and methods may be used to evaluate a variety of different types or data in a number of different industries. In many cases, the analysis and/or processing may include a request to access data (e.g., stored data, streaming data, etc.) and then to process the data using one or more workflows associated with the environment 506. In at least one embodiment, a selected workflow may be based, at least in part, on information provided by the computing device, such as a command, or based on data received by the environment 520. The network(s) 520 can include any appropriate network, such as the Internet, a local area network (LAN), a cellular network, an Ethernet, or other such wired and/or wireless network. The provider environment 506 can include any appropriate resources for accessing data or information, such as EHR, as may include various servers, data stores, and other such components known or used for accessing data and/or processing data from across a network (or from the "cloud"). Moreover, the client computing device can be any appropriate computing or processing device, as may include a desktop or notebook computer, smartphone, tablet, wearable computer (e.g., smart watch, glasses, contacts, headset, etc.), server, or other such system or device.

An interface layer 524, when receiving a request or call, can determine the type of call or request and cause information to be forwarded to the appropriate component or sub-system. For example, the interface 524 may be associated with one or more landing pages, as an example, to guide a user toward a workflow or action. In at least one embodiment, the interface layer 524 may include other functionality and implementations, such as load balancing and the like.

Various embodiments of the present disclosure are directed toward processing and/or evaluation of EHR, among other features, and as a result certain data protection operations may be deployed. In at least one embodiment, an authentication service may be associated with the provider environment 506 to verify credentials provided by the client device. Furthermore, in at least one embodiment, verification may also determine a level of accessibility within the environment 506, which may be on an application-basis, a user-basis, or some combination thereof. For example, a first user may have access to the environment, but only have a limited set of applications that are accessible, while a second user may have access to more applications, and a third user may be entirely barred from the environment. In this manner, access may be controlled and information related to EHR may be protected.

Systems and methods may include a web-based or application-based portal that permits receipt, analysis, and evaluation of information, such as EHR, that may include multi-modal information including text data, video data, image data, audio data, and/or combinations thereof. Requests may be processed by one or more managers 526 and then routed toward appropriate endpoints and/or may trigger one or more workflows. The provider environment 506 may include one or more ML systems 528 that may be used to process information, for example from one or more patient data stores 530. The ML systems 582 may be the same as or different from the ML system 514 associated with the control system. 504. For example, many ML systems may execute models using one or more graphics processing units (GPUs) and, therefore, additional compute resources may be used compared to what is available on the control system 504. In certain embodiments, the ML system 514 may be a lightweight edge model while the ML system 528 may include more robust models. An analysis engine 532 may be used to analyze and provide diagnostic information using the data acquired by the EMS 502. For example, different probabilities of diagnostic conditions may be determined using the data.

Figure 6:
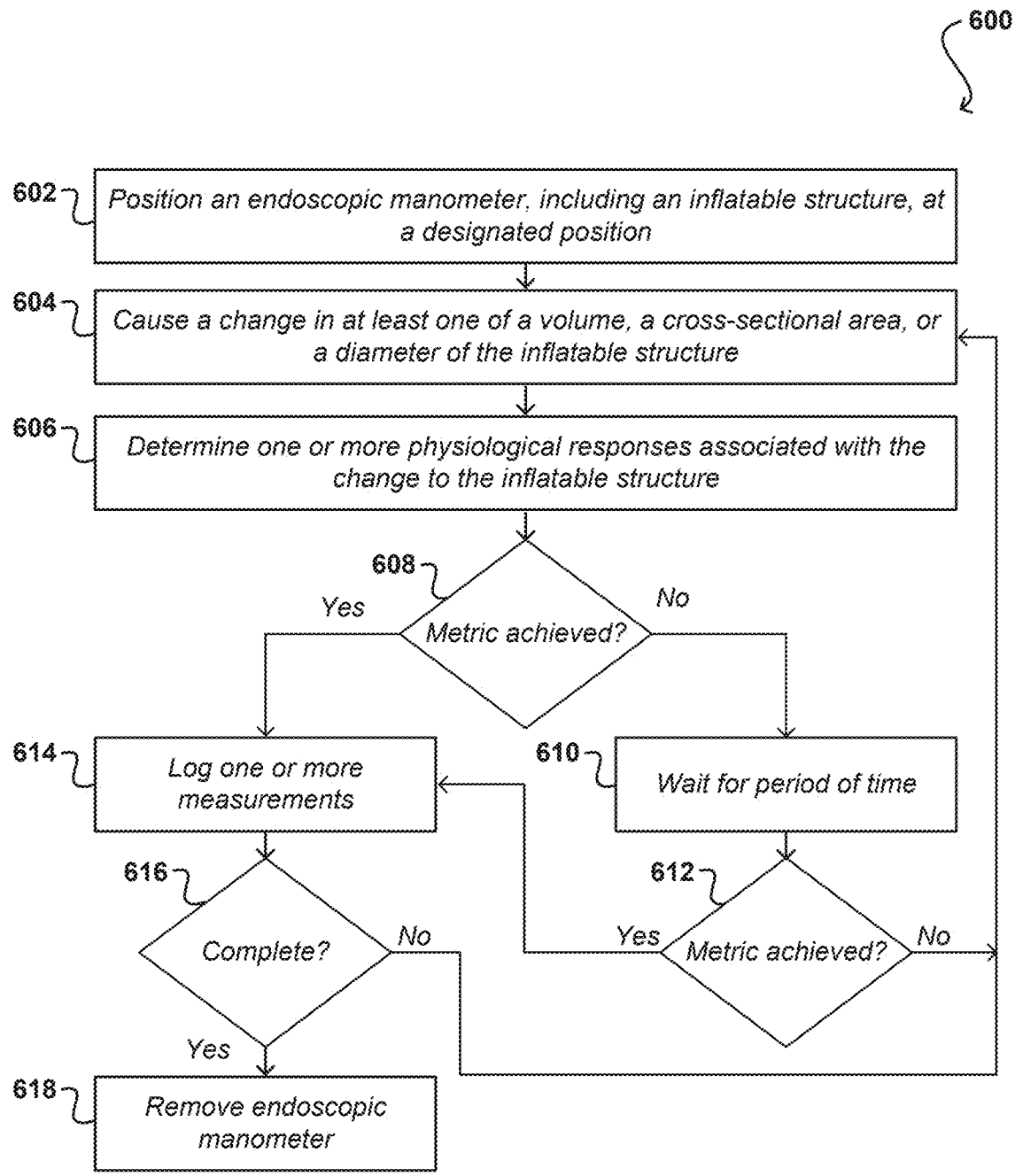
FIG. 6 is a flow chart of a process for performing an endoscopic manometer procedure, in accordance with embodiments of the present disclosure.

FIG. 6 illustrates an example flow chart for a process 600 for performing endoscopic manometry to record data from one or more sensors while a patient is sedated. It should be appreciated that steps for the method may be performed in any order, or in parallel, unless otherwise specifically stated. Moreover, the method may include more or fewer steps. In this example an endoscopic manometer, which may include an inflatable structure as discussed herein, is positioned at a designated location 602. For example, in an embodiment where an esophagus is being evaluated, the designation location may correspond to a position below the UES. A change to at least one of a volume, a cross-sectional area, or a diameter of the inflatable structure may be caused to occur 604. One or more embodiments may include driving a fluid into the inflatable structure, such as air into a balloon, to increase at least one of the volume, cross-sectional area, or diameter of the inflatable structure and/or to remove a fluid from the inflatable structure to decrease at least one of the volume, cross-sectional area, or diameter of the inflatable structure.

In at least one embodiment, one or more physiological responses associated with the change to the inflatable structure may determined 606. For example, sensor information may be monitored to determine whether or not a certain physiological response occurs responsive to the change. The sensor information may be monitored by a human or machine, or combinations thereof. Based on the determination of the physical response, it may be determined whether or not a metric is achieved 608. The metric may be associated with an indication that a desired or target response is elicited by the change. For the non-limiting example of esophagus evaluation, the desired response may be peristalsis. If the metric is not achieved, then a waiting period may be conducted 610 and then the metric may be re-evaluated 612. If the metric is still not achieved, then the method may return to cause another change to the inflatable structure.

If the metric is achieved, then one or more measurements may be logged 614. For example, sensor information may be recorded and tagged or otherwise associated with the physiological response. Thereafter, it may be determined whether the analysis or procedure is complete 616. If not, additional changes may be induced and more data may be logged. If the procedure is complete, the endoscopic manometer may be removed 618. In this manner, systems and methods of the present disclosure may be used to perform one or more procedures using a manometer while a patient is sedated that would otherwise be performed while a patient is awake, such as when determining function of an esophagus. Accordingly, systems and methods address and overcome problems associated with existing procedures that are both physically and psychologically painful for patients.

Embodiments may enable practitioners to assess motility in an expedited and painless (e.g., substantially painless) way. For example, one or more embodiments may enable manometry to be performed when a patient is undergoing a sedated endoscopy. As a result, both procedures may be performed at a single appointment, thereby reducing costs and time burdens. Additionally, one or more diagnostic determinations may be performed during the endoscopy visit and/or shortly after, which may expediate treatment. Moreover, embodiments may reduce discomfort to patients, such as avoiding the use of various systems, such as transnasal catheters for esophageal procedures, which patients may dislike. Furthermore, as discussed herein, embodiments may be integrated into existing systems and/or provided as a separate system that may be attached to existing manometry systems.

Figure 7:
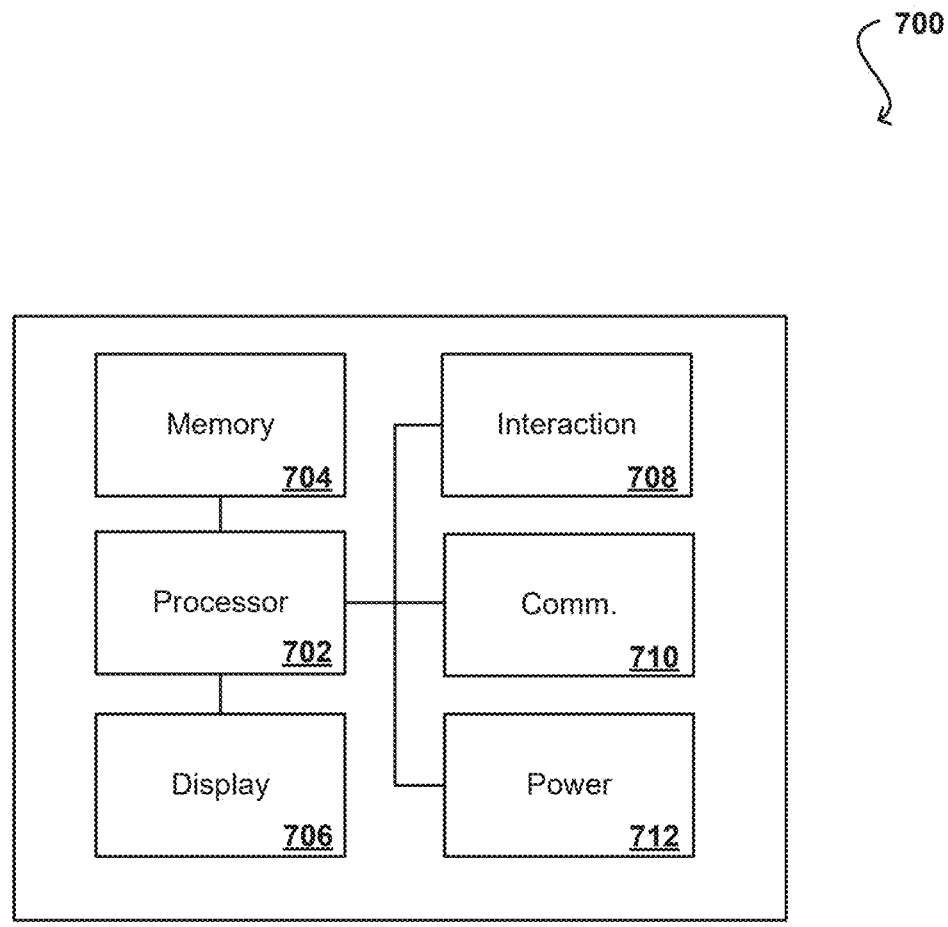
FIG. 7 is an example configuration for a computing device, in accordance with embodiments of the present disclosure.

FIG. 7 illustrates a set of general components of an example computing device 700. In this example, the device includes a processor 702 for executing instructions that can be stored in a memory 704. The device can include many types of memory, data storage, or non-transitory computer-readable storage media, such as a first data storage for program instructions for execution by the processor 702, a separate storage for images or data, a removable memory for sharing information with other devices, etc. The device may optionally include a display element 706, such as a touch screen or liquid crystal display (LCD), although devices such as portable media players might convey information via other means, such as through audio speakers, and other devices may not include displays, such as server components executing within data centers, among other options. As discussed, the device in many embodiments will include at least one interaction component 708 able to receive input from a user. This input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 700 of FIG. 7 can include one or more network interface or communication components 710 for communicating over various networks, such as a Wi-Fi, Bluetooth, RF, wired, or wireless communication systems. The device may be configured to communicate with a network, such as the Internet, and may be able to communicate with other such devices. The device will also include one or more power components 712, such as power cords, power ports, batteries, wirelessly powered or rechargeable receivers, and the like.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

Embodiments may also be described in view of the following clauses:

1. A system, comprising:
 a carrier;
 a plurality of sensors associated with the carrier, the plurality of sensors arranged along a length of the carrier; and
 an inflatable structure associated with the carrier, the inflatable structure having an injection port to receive a fluid, wherein the inflatable structure is configured to have at least one of a first diameter, a first volume, or a first cross-sectional area in a relaxed position and at least one of a second diameter, a second volume, or a second cross-sectional area in an engaged position.

2. The system of clause 1, wherein the inflatable structure is configured to be positioned below an upper esophageal sphincter during a medical procedure in which a patient receiving the medical procedure is sedated.

3. The system of clause 2, wherein activation of the inflatable structure to transition from the relaxed position to the engaged position causes the patient to have a physiological response corresponding to peristalsis.

4. The system of clause 1, wherein the carrier is a catheter and the inflatable structure is a balloon.

5. The system of clause 1, wherein each sensor of the plurality of sensors and the inflatable structure are incorporated within the carrier.

6. The system of clause 1, further comprising:
 a second carrier incorporating the inflatable structure, wherein the second carrier is coupled to the carrier.

7. The system of clause 1, wherein the fluid is air.

8. The system of clause 1, further comprising:
 a control system configured to receive data collected by the plurality of sensors and to control a flow of the fluid into and out o the injection port.

9. A method, comprising:
 positioning, an inflatable structure at a designated position associated with a tissue structure of a patient;
 causing a change in at least one of a volume, a cross-sectional area, or a diameter of the inflatable structure;
 determining the change successfully induced a target physiological response;
 logging one or more measurements associated with a condition of the tissue structure;
 reversing the change in at least one of the volume, the cross-sectional area, or the diameter of the inflatable structure; and
 removing the inflatable structure from the tissue structure.

10. The method of clause 9, wherein the tissue structure is the esophagus and the one or more measurements are pressure measurements from a manometer.

11. The method of clause 9, wherein the inflatable structure is a balloon.

12. The method of clause 9, wherein causing the change in at least one of a volume, a cross-sectional area, or a diameter of the inflatable structure further comprises:
 directing air into the inflatable structure or removing air from the inflatable structure.

13. The method of clause 9, wherein the target physiological response is at least one of relaxation of the lower esophageal sphincter or peristalsis.

14. The method of clause 9, further comprising:
 causing a second change in at least one of the volume, the cross-sectional area, or the diameter of the inflatable structure;
 determining the second change was unsuccessful in inducing the target physiological response;
 waiting for a threshold period of time;
 after the threshold period of time, determining the second change successfully induced the target physiological response; and
 logging one or more second measurements associated with the condition of the tissue structure.

15. The method of clause 9, wherein at least the positioning of the inflatable structure and the causing the change in at least one of the volume, the cross-sectional area, or the diameter of the inflatable structure is performed while the patient is sedated.

16. A system, comprising:
 a catheter;
 a plurality of sensors arranged along at least a portion of a length of the catheter; and
 an inflatable structure associated with the catheter, the inflatable structure having an injection port to receive a fluid to transition between a first inflatable structure volume and a second inflatable structure volume, wherein the first inflatable structure volume is less than the second inflatable structure volume.

17. The system of clause 16, wherein the inflatable structure is configured to be positioned below an upper esophageal sphincter of a patient during an endoscopy in which the patient is sedated.

18. The system of clause 17, wherein the transition between the first inflatable structure volume to the second inflatable structure volume induces peristalsis in the patient.

19. The system of clause 16, wherein the inflatable structure is a balloon and the fluid is air.

20. The system of clause 16, wherein the inflatable structure is at least one of integrated into the catheter or coupled to the catheter.

21. A system, comprising:
 a carrier;
 a plurality of sensors associated with the carrier, the plurality of sensors arranged along a length of the carrier; and
 an inflatable structure associated with the carrier, the inflatable structure having an injection port to receive a fluid, wherein the inflatable structure is configured to have at least one of a first diameter, a first volume, or a first cross-sectional area in a relaxed position and at least one of a second diameter, a second volume, or a second cross-sectional area in an engaged position.

22. The system of clause 21, wherein the inflatable structure is configured to be positioned below an upper esophageal sphincter during a medical procedure in which a patient receiving the medical procedure is sedated.

23. The system of clause 22, wherein activation of the inflatable structure to transition from the relaxed position to the engaged position causes the patient to have a physiological response corresponding to peristalsis.

24. The system of any of clauses 21-23, wherein the carrier is a catheter and the inflatable structure is a balloon.

25. The system of any of clauses 21-24, wherein each sensor of the plurality of sensors and the inflatable structure are incorporated within the carrier.

26. The system of any of clauses 21-25, further comprising:
a second carrier incorporating the inflatable structure, wherein the second carrier is coupled to the carrier.

27. The system of any of clauses 21-26, wherein the fluid is air.

28. The system of any of clauses 21-27, further comprising:
a control system configured to receive data collected by the plurality of sensors and to control a flow of the fluid into and out o the injection port.

29. A method, comprising:
positioning, an inflatable structure at a designated position associated with a tissue structure of a patient;
causing a change in at least one of a volume, a cross-sectional area, or a diameter of the inflatable structure;
determining the change successfully induced a target physiological response;
logging one or more measurements associated with a condition of the tissue structure;
reversing the change in at least one of the volume, the cross-sectional area, or the diameter of the inflatable structure; and
removing the inflatable structure from the tissue structure.

30. The method of clause 29, wherein the tissue structure is the esophagus and the one or more measurements are pressure measurements from a manometer.

31. The method of any of clauses 29 or 30, wherein the inflatable structure is a balloon.

32. The method of any of clauses 29-31, wherein causing the change in at least one of a volume, a cross-sectional area, or a diameter of the inflatable structure further comprises:
directing air into the inflatable structure or removing air from the inflatable structure.

33. The method of any of clauses 29-32, wherein the target physiological response is at least one of relaxation of the lower esophageal sphincter or peristalsis.

34. The method of any of clauses 29-33, further comprising:
causing a second change in at least one of the volume, the cross-sectional area, or the diameter of the inflatable structure;
determining the second change was unsuccessful in inducing the target physiological response;
waiting for a threshold period of time;
after the threshold period of time, determining the second change successfully induced the target physiological response; and
logging one or more second measurements associated with the condition of the tissue structure.

35. The method of any of clauses 29-34, wherein at least the positioning of the inflatable structure and the causing the change in at least one of the volume, the cross-sectional area, or the diameter of the inflatable structure is performed while the patient is sedated.

36. A system, comprising:
a catheter;
a plurality of sensors arranged along at least a portion of a length of the catheter; and
an inflatable structure associated with the catheter, the inflatable structure having an injection port to receive a fluid to transition between a first inflatable structure volume and a second inflatable structure volume, wherein the first inflatable structure volume is less than the second inflatable structure volume.

37. The system of clause 36, wherein the inflatable structure is configured to be positioned below an upper esophageal sphincter of a patient during an endoscopy in which the patient is sedated.

38. The system of clause 37, wherein the transition between the first inflatable structure volume to the second inflatable structure volume induces peristalsis in the patient.

39. The system of any of clauses 36-38, wherein the inflatable structure is a balloon and the fluid is air.

40. The system of any of clauses 36-39, wherein the inflatable structure is at least one of integrated into the catheter or coupled to the catheter.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method, comprising:
positioning an inflatable structure at a designated position associated with a tissue structure of a patient;
causing a change in at least one of a volume, a cross-sectional area, or a diameter of the inflatable structure;
determining the change successfully induced a target physiological response;
logging one or more measurements associated with a condition of the tissue structure;
reversing the change in at least one of the volume, the cross-sectional area, or the diameter of the inflatable structure;
causing a second change in at least one of the volume, the cross-sectional area, or the diameter of the inflatable structure;
determining the second change was unsuccessful in inducing the target physiological response;
waiting for a threshold period of time;
after the threshold period of time, determining the second change successfully induced the target physiological response;
logging one or more second measurements associated with the condition of the tissue structure; and
removing the inflatable structure from the tissue structure.

2. The method of claim 1, wherein the tissue structure is an esophagus and the one or more measurements are pressure measurements from a manometer.

3. The method of claim 1, wherein the inflatable structure is a balloon.

4. The method of claim 1, wherein causing the change in at least one of a volume, a cross-sectional area, or a diameter of the inflatable structure further comprises:
   directing air into the inflatable structure or removing air from the inflatable structure.

5. The method of claim 1, wherein the target physiological response is at least one of relaxation of a lower esophageal sphincter or peristalsis.

6. The method of claim 1, wherein at least the positioning of the inflatable structure and the causing the change in at least one of the volume, the cross-sectional area, or the diameter of the inflatable structure is performed while the patient is sedated.

7. A method, comprising:
   positioning an inflatable structure at a designated position associated with a tissue structure of a patient;
   causing a change in at least one of a volume, a cross-sectional area, or a diameter of the inflatable structure;
   determining the change successfully induced a target physiological response;
   logging one or more measurements associated with a condition of the tissue structure;
   causing a second change in at least one of the volume, the cross-sectional area, or the diameter of the inflatable structure;
   determining the second change was unsuccessful in inducing the target physiological response;
   waiting for a threshold period of time;
   after the threshold period of time, determining the second change successfully induced the target physiological response;
   logging one or more second measurements associated with the condition of the tissue structure
   reversing at least one of the change or the second change in at least one of the volume, the cross-sectional area, or the diameter of the inflatable structure; and
   removing the inflatable structure from the tissue structure.

8. The method of claim 7, wherein the tissue structure is an esophagus and the one or more measurements are pressure measurements from a manometer.

9. The method of claim 7, wherein the inflatable structure is a balloon.

10. The method of claim 7, wherein causing the change in at least one of a volume, a cross-sectional area, or a diameter of the inflatable structure further comprises:
    directing air into the inflatable structure or removing air from the inflatable structure.

11. The method of claim 7, wherein the target physiological response is at least one of relaxation of a lower esophageal sphincter or peristalsis.

12. The method of claim 7, wherein at least the positioning of the inflatable structure and the causing the change in at least one of the volume, the cross-sectional area, or the diameter of the inflatable structure is performed while the patient is sedated.

* * * * *